United States Patent [19]

Lambert et al.

[11] Patent Number: 4,890,282
[45] Date of Patent: Dec. 26, 1989

[54] MIXED MODE COMPRESSION FOR DATA TRANSMISSION

[75] Inventors: Maureen K. Lambert, Moss Beach; Roger P. Chrisman, Portola Valley, both of Calif.

[73] Assignee: Network Equipment Technologies, Inc., Redwood City, Calif.

[21] Appl. No.: 165,482

[22] Filed: Mar. 8, 1988

[51] Int. Cl.$^4$ .............................................. H04J 3/16
[52] U.S. Cl. ...................................... 370/79; 370/118
[58] Field of Search ............... 370/79, 81, 110.1, 118, 370/84; 375/122

[56] References Cited
U.S. PATENT DOCUMENTS 4,747,096 5/1988 Piasecki et al. ................... 370/110.1

Primary Examiner—Benedict V. Safourek
Assistant Examiner—Wellington Chin
Attorney, Agent, or Firm—Fliesler, Dubb, Meyer & Lovejoy

[57] ABSTRACT

In an integrated digital network with at least three nodes, A, B, and C, a call placed at node A to be transmitted through the network from node A to node B to node C, is compressed in multiple modes. In response to the path selected, the speech signal in node A is compressed in a first mode for transmission to node B. In node B, the speech signal is compressed in a second mode for transmission to node C, where the first and second modes involve dissimilar algorithms for compression of speech signals. At node C, the speech signal would again be adapted for supply to a receiving station. The system can accommodate as many modes of compression as desired.

25 Claims, 8 Drawing Sheets

MIXED-MODE COMPRESSION

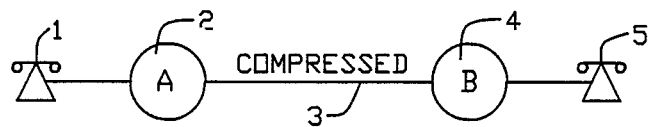
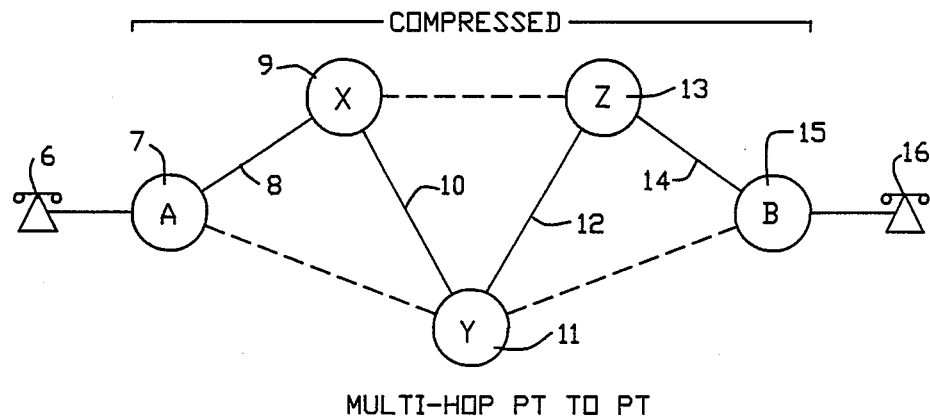
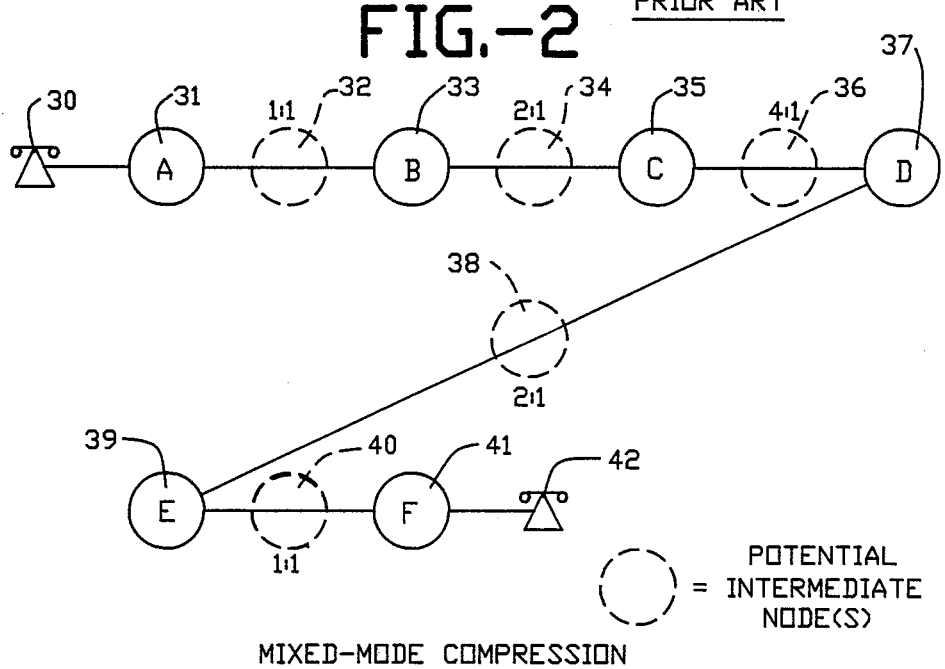

MIXED-MODE COMPRESSION

MIXED MODE COMPRESSION FOR DATA TRANSMISSION

BACKGROUND OF THE INVENTION

1. Field of the Invention

The present invention relates to communication networks through which compressed data is transmitted. In particular, an integrated digital network employing mixed compression modes for speech is disclosed.

2. Description of Related Art

Historically, speech compression in communication networks has been available on a point-to-point basis only. As illustrated in FIG. 1, a call from telephone 1 enters a network at point A, and is passed through speech processing equipment 2 at point A. The call is then transmitted in a compressed mode across a link 3, to point B, where conjugate speech processing equipment 4 decodes the compressed data to recover the original signals and supplies them in a mode compatible with the receiving station 5.

More recently, as illustrated in FIG. 2, equipment has been available that allows end-to-end speech compression on a more complex, multi-hop circuit. For instance, such networks are provided by multiple integrated digital network exchange switches such as those provided by Network Equipment Technologies, Inc., the assignee of the present invention. Such networks, for example, allow speech signals entering the network from a first station 6, to enter speech processing equipment 7 at point A, and to be passed in a compressed mode through link 8 to point X, where equipment 9 transmits the compressed data on link 10 to point Y. At point Y, equipment 11 transmits the compressed data on link 12 to point Z, where equipment 13 transmits the compressed data on link 14 to point B. At point B, conjugate speech expansion equipment 15 reconstitutes the original speech signal which is then delivered to the receiving station 16.

One example of a prior art end-to-end speech compression algorithm is illustrated in U.S. Pat. No. 4,679,187 entitled ADAPTIVE TRUNK-COMPRESSION SYSTEM WITH CONSTANT GRADE OF SERVICE; invented by David R. Irvin. In the Irvin patent, varying traffic intensity is handled with a dynamic trunk compression system for end-to-end processing of a speech signal entering the network. The adaptive compression system of Irvin involves varying the sample rate for pulse code modulation (PCM) of a speech signal in order to vary the number of channels that can be carried on a single trunk in the system. The sample rate and number of channels on the trunk are calculated upon coding of the speech signal and those parameters are transmitted with the speech signal to the receiving station. At the receiving station the parameters are read and the speech decoded according to the same dynamic compression algorithm. Irvin addresses the problem of making efficient use of transmission resources by adapting the coding rate for PCM speech signals. However, as an end-to-end system, it illustrates the problem addressed by the present invention. That is, all receiving stations must have equipment capable of decoding the data from the adaptive PCM formats.

In the end-to-end networks of the prior art such as taught by Irvin, a single compression algorithm is used to assure complete compatibility throughout the network for transmitting and receiving signals. As the traffic increases within a network of the prior art, either the whole network requires modification to a compression algorithm to provide higher data flow in existing links, or additional switches and links must be purchased and added to the system. Expansion of a network to handle increased traffic load can be an expensive, complicated task.

SUMMARY OF THE INVENTION

The present invention provides a method and apparatus for mixed-mode compression within a single network for data transmission.

The apparatus according to the present invention is a network for communicating information among stations for sending and receiving the information. The apparatus comprises a plurality of access and switching nodes and a plurality of links connecting the access and switching nodes in a communication network. The links include means for transmitting channels of coded information between the nodes to which they are connected.

The access nodes comprise a station port coupled to a station for communicating information to and from the station, a link port coupled to a link for communicating channels to and from the link, connecting means coupled to the station port and link port, for connecting selected information or channels to a selected one of the station ports or link ports for transmission on a selected link or to a selected station, coding means coupled to the station port and the connecting means, for coding the information from a station according to a preselected one of a plurality of compression modes for transmission in a channel, and decoding means, coupled to the link port and the connecting means, for decoding information in a channel according to a preselected one of the plurality of compression modes for communicating the information to the station.

The switching nodes comprise a plurality of link ports, each coupled to at least one link, for communicating channels to and from the links, connecting means, coupled to the link ports, for connecting selected channels to one of the plurality of link ports in the switching node for transmission on a selected link, and coding means, coupled to the link port and the connecting means, for coding the information in a channel according to a selected one of the plurality of compression modes for transmission of the information in a channel across a link.

In the network according to the present invention, the mode of compression of a channel of speech information is determined by the ports through which it is transmitted. As a node in the network determines the link across which it will transmit data, the mode of compression of the data is determined and the data is coded according to that mode. When a node receives data across a link, the mode of compression of data is determined and the data is processed accordingly.

According to the present invention as illustrated by FIG. 3, speech from telephone station 30 may enter the network at point A where equipment 31 transmits the speech in a first mode, such as full pulse code modulation, having a bandwidth of 64 kilobits per second to node B, through intermediate nodes 32 if necessary. From node B, equipment 33 transmits the data in a second mode of compression such as adaptive differential pulse code modulation (ADPCM), through intermediate nodes 34 if necessary. In the second mode in which data is transmitted from node B, the bit rate is reduced to 32 kilobits per second for reception at node C. At node C, equipment 35 employs a third mode of compression, such as digital speech interpolation (DSI). Transmission then takes place through the network in the third compression mode having an effective bit rate of 32 kilobits per second, though interleaved with other speech signals, to node D, and again through as many intermediate nodes 36 as necessary. At node D, equipment 37 supplies the inverse DSI function to return the signal to ADPCM at 32 kilobits per second for transmission through the network (intermediate nodes 38, if necessary,) to node E. At node E, equipment 39 supplies the inverse ADPCM function to return the signal to full bandwidth PCM at 64 kilobits per second for transmission through the network (intermediate nodes 40, if necessary,) to node F where equipment 41 delivers the speech signal to the user.

Several permutations of this compression scenario are entirely acceptable. For example, an ADPCM compression may be invoked at the point of entrance, node A, or point of exit, node F. It is equally acceptable for ADPCM and DSI compression to be coincident in node C or D, for example, or both. Further, full four-to-one compression can be invoked at either or both of the entry and exit nodes A or F.

In the preferred implementation, all of this is done automatically, according to pre-established compression and transmission preferences for each circuit, utilizing resources available at the time the circuit is established in the network. Since compression equipment and transmission paths are assigned at call placement time, it is therefore possible for identical calls placed through the network at different times to have no compression applied, 2:1 ADPCM, or 4:1 ADPCM/DSI, depending on the availability of compression resources in the particular path chosen through the network for the call.

As shown conceptually in FIG. 4, the mixed mode compression of the present invention allows networks to be built that employ 4:1 compression on high traffic density backbone links in the core of a network, while 2:1 compression is employed simultaneously in the outer less dense layers, and no compression is used in the outermost, low density access links. This can result in significant savings in both initial equipment cost and ongoing operational cost.

BRIEF DESCRIPTION OF THE DRAWINGS

FIG. 1 is a heuristic diagram of a prior art

FIG. 2 is a heuristic diagram of a prior art multi-hop point-to-point network.

FIG. 3 is a heuristic diagram of a network according to the present invention, employing mixed-mode compression.

DESCRIPTION OF THE PREFERRED EMBODIMENT

Figure 4:
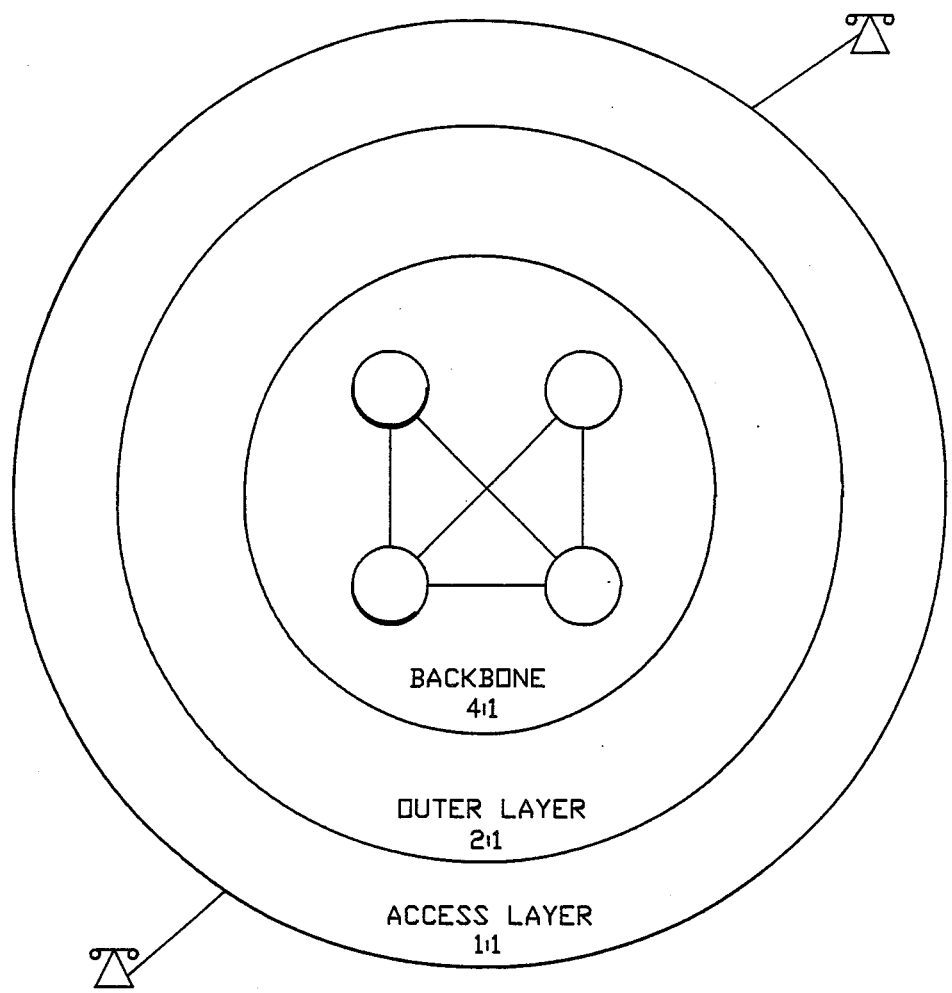
FIG. 4 is a conceptual diagram of a multiple layer network employing mixed-mode compression according to the present invention.
Figure 5:
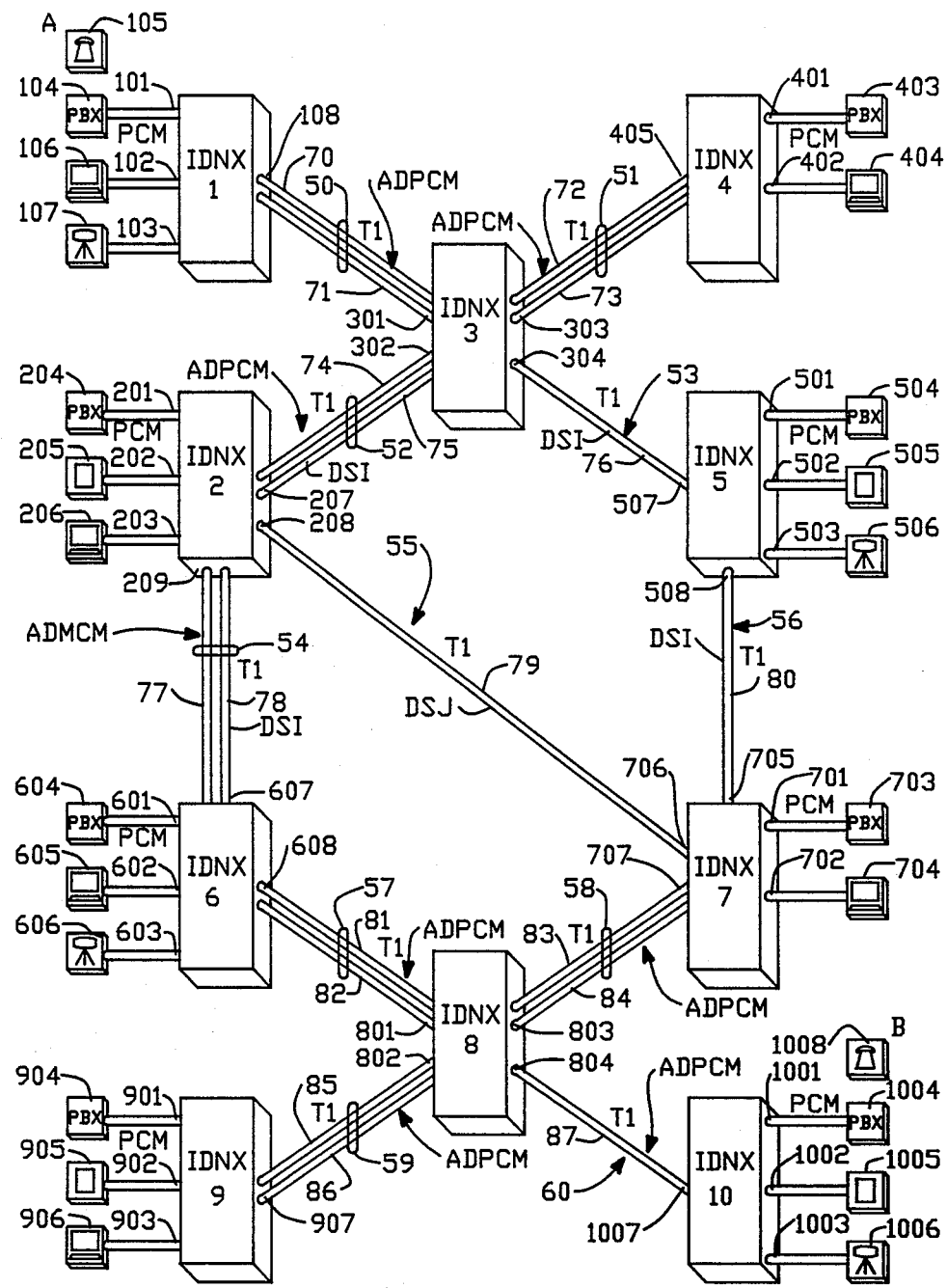
FIG. 5 is a block diagram of a network according to the present invention employing ten integrated digital network exchange switches with multiple modes of compression.

A detailed description of a preferred embodiment of the present invention is provided with reference to FIGS. 5–10. FIG. 5 illustrates an example of a network for communicating data having ten integrated digital network exchanges (IDNX1–IDNX-10), implementing multi-mode compression according to the present invention. The physical interconnection of IDNX1 through IDNX10 and the stations supplying data to the network is described. Then, the architecture of the IDNX exchanges is described with reference to FIG. 6. Finally, an example of the operation of the network using mixed-mode compression is set out with control algorithms for individual nodes as illustrated in FIGS. 7–10.

I. Network Configuration

FIG. 5 illustrates a network configuration. The first exchange in the network IDNX1 includes three ports, 101, 102, 103, to stations supplying data for transmission in the network. Port 101 connects to a private branch exchange (PBX) 104 (or equivalent channel banks or key systems for speech coding) through which telephone calls as illustrated by block 105 are placed. Port 102 connects to a computer 106. Port 103 connects to a teleconferencing system 107.

Each of the station ports 101, 102, 103 connected to IDNX1 and those connected to the other IDNX exchanges in the network, are means for communicating coded information from a station to the exchange. For instance, in PBX stations in the preferred embodiment, the data is coded at 64 kilobits per second according to a pulse-code modulation scheme.

IDNX1 also includes a port 108 to a link 50 for transmitting channels of coded data to IDNX3. The link 50 connected to port 108 of the IDNX1 includes two T1 trunks 70, 71, for transmission of data and coded speech according to the international T1 multiplexing standard, with 1.544 Mbits/sec. capacity.

Speech transmitted across link 50 from IDNX1 to IDNX3 will be coded according to a selected mode of compression that is compatible with compression equipment in the respective nodes. For instance, in the embodiment of FIG. 5, IDNX1 may receive coded data from the PBX 104 through its port 101 in a full PCM mode. Data may then be compressed in IDNX1 to ADPCM for transmission across link 50. Likewise, data incoming from IDNX3 to IDNX1 across link 50 may be received in ADPCM mode and translated to PCM for communication to the PBX station 104.

IDNX2 includes three station ports 201, 202, 203, which are connected, respectively, to a PBX 204, a large capacity storage device for computer data 205, and a screen 206 for displaying teleconferencing information or the like. IDNX2 further includes three link ports 207, 208, 209, for communicating information across links 52, 55 and 54, respectively. Link 52 includes two T1 trunks 74 and 75. Link 54 includes two T1 trunks 77 and 78. Link 55 includes one T1 trunk 79.

IDNX2 can receive concentrated data across link 52 for transmission across links 54 and 55, to other IDNX switches in the network; or, it may receive information directly from stations across ports 201, 202 or 203.

IDNX3 includes four link ports 301, 302, 303, 304, connected, respectively, to links 50, 52, 51, 53, for communication of information in coded channels to other switching nodes in the network. Link 51 includes two T1 trunks 71 and 73. Link 53 includes one T1 trunk 76.

IDNX4 includes two station ports 401, 402, connected, respectively, to a PBX 403 and a computer terminal 404. IDNX4 includes one link port 405 connected to link 51.

IDNX5 includes three stations ports 501, 502, 503, connected, respectively, to a PBX station 504, a large capacity storage device 505, and a teleconferencing system 506. IDNX5 includes two link ports 507 and 508 connected, respectively, to link 53 and link 56. Link 56 includes one T1 trunk 80.

IDNX6 includes three station ports 601, 602, 603, connected, respectively, to a PBX station 604, a computer terminal station 605, and a teleconferencing station 606. IDNX6 includes two link ports 607 connected to link 54, and 608 connected to link 57. Link 57 includes two T1 trunks 81 and 82.

IDNX7 includes two station ports 701 and 702, connected, respectively, to a PBX station 703 and a computer terminal station 704. IDNX7 includes three link ports 705, 706, and 707 connected, respectively, to links 56, 55 and 58. Link 58 includes two T1 trunks 83 and 84.

IDNX8 includes four link ports 801, 802, 803 and 804, connected, respectively, to links 57, 59, 58 and 60. Link 59 includes two T1 trunks 85 and 86 and link 60 includes one T1 trunk 87.

IDNX9 includes three station ports 901, 902, 903, connected, respectively, to a PBX station 904, a high capacity data storage station 905, and a teleconference viewing station 906. In addition, IDNX9 includes one link port 907 connecting to link 59.

IDNX10 includes three station ports 1001, 1002, 1003, connecting respectively to PBX station 1004, a high capacity data storage station 1005, and a teleconferencing station 1006. Also, IDNX10 includes one link port 1007, connected to link 60.

In the preferred embodiment, the mixed-mode compression is carried out only for speech signals. The invention can be applied to any data suitable for multiple compression modes, such as may be supplied by teleconferencing systems, computers, medical imaging machines and other sources of information.

For speech signals, the station ports to the IDNX blocks could be considered the access layer in which full pulse code modulation of the speech signals is transmitted from the exchange to the station.

The outer layer in the network of FIG. 5 is illustrated by links 50, 51, the trunk 74 of link 52, trunk 77 of link 54, link 57, link 58, link 59 and link 60. In all of these links, full ADPCM compression is performed. In links 52 and 54 where one trunk in the two-trunk link is not DSI-capable, a second trunk in the link is adapted to carry ADPCM/DSI to increase network bandwidth.

The "backbone" of the network of FIG. 5 is made up of trunk 75 of link 52, link 53, trunk 78 of link 54, link 55 and link 56 which are capable of full ADPCM/DSI compression for the very high capacity required for links in the backbone of the network.

II. Integrated Digital Network Exchange Architecture

Figure 6:
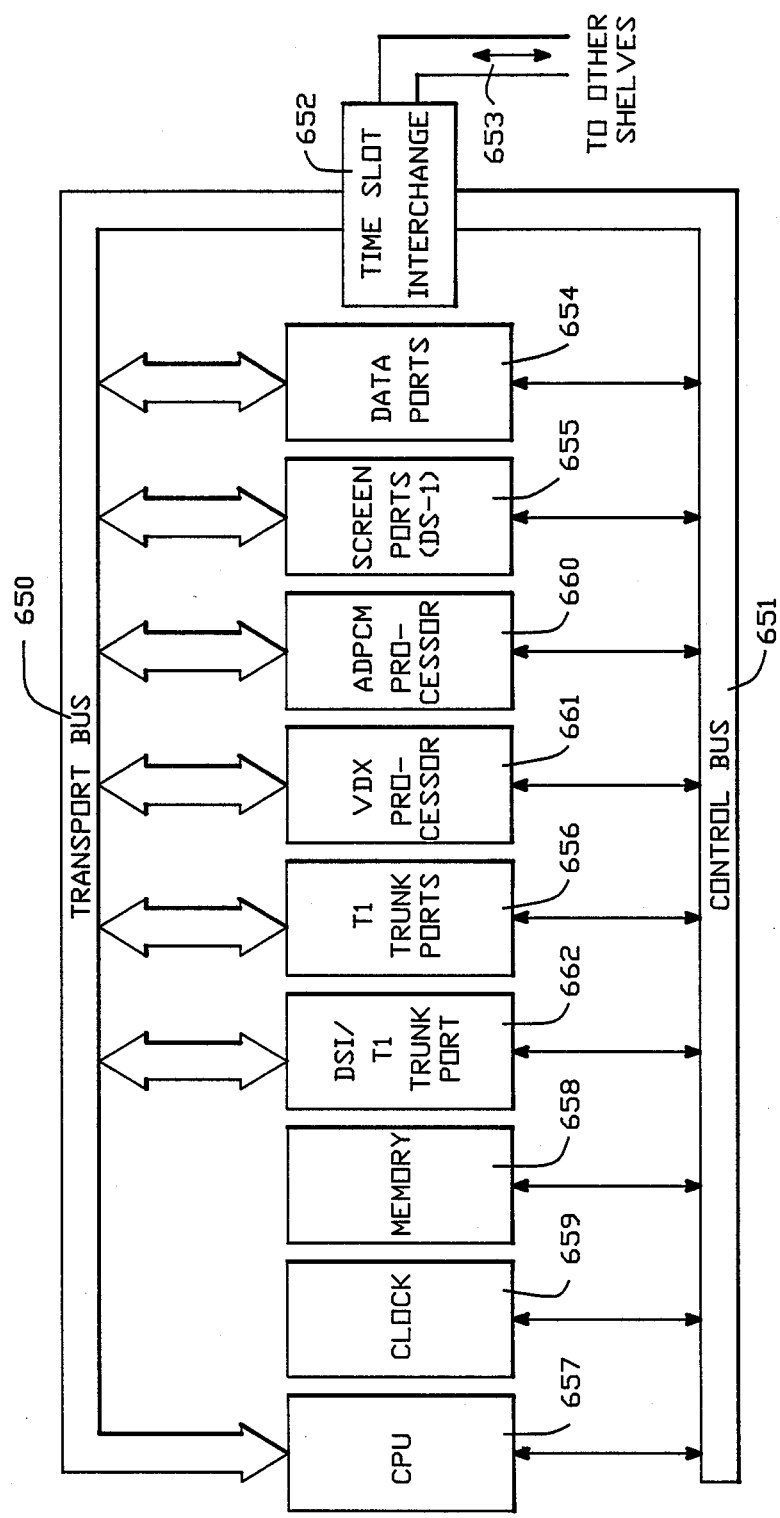
FIG. 6 is a block diagram of an integrated digital network exchange according to the present invention.

An architecture for a network exchange, such as one of IDNX1-IDNX10 illustrated in FIG. 5, is shown in FIG. 6. This architecture supports nodes in any layer of the multi-mode network. The IDNX includes a transport bus 650 and a control bus 651 that are controlled by a time slot interchange module 652. A given IDNX may include a plurality of shelves of modules such as those shown in FIG. 6, to which communication is provided through bus 653 and the time slot interchange module 652.

The station ports in the IDNX include data ports 654 and speech ports 655. The speech port 655 is a standard DS-1 voice port module for managing interface between voice communications equipment, such as analog and digital PBX's, D3-D4 channel banks and the like, with the IDNX. The speech ports 655 work with the supervisor software running in a CPU module 657 to support dialing, telephone calls and other system management tasks required to set up a telephone communication network.

The data ports 654 are station ports for communicating high speed data and the like to other types of stations.

The link ports include T1 trunk ports 656 which include processing resources to receive or supply T1 multiplexed data for transmission to other nodes. The T1 trunk ports 656 contain logic to control the flow of information to T1 trunks. As described with reference to FIG. 5, the T1 trunks establish the links between nodes in the network. The trunk port 656 is the point at which a call leaves the IDNX and enters a link, or arrives from a remote node.

The host processor for the IDNX includes a CPU module 657, a memory module 658 and a clock module 659. The processor through the CPU module 657 communicates control information to the control bus 651 for supply to the other modules in the system. User data flows from card to card through the time slot interchange module 652 under CPU program control across transport bus 650.

The CPU module 657 runs software that controls the system. Supervisor software under control of the CPU module 657, establishes a logical end-to-end circuit called a channel for a given call. In addition, the CPU module 657 can provide input/output facilities for setting up system configuration information, monitoring activity in the system and maintenance.

The memory module 658 communicates with CPU module across the control bus 651 and stores system software for use in the CPU module 657. In addition, the memory module 658 stores a configuration data base used by the supervision software for establishing circuits through the network.

The clock module 659 serves as in internal timing source and can be used for network synchronization if desired. The clock module communicates with the other modules in the IDNX across the control bus.

The time slot interchange (TSI) module 652 handles the transport bus switching. For each new call connection set up through a node, supervisor software programs run in the CPU module 657, direct the TSI module 652 to connect the time slots from one module in the system to cycles on the destination module adapted to receive the data. The connection can be established in both directions to set up a full duplex call.

Modules 660, 661 and 662 are speech compression processors. These modules increase the voice call capacity of the T1 trunks. Speech processor modules 660, 661 and 662 provide speech compression serving multiple channels. A voice channel requiring speech compression routes through one or more speech processor modules 660, 661, and 662 before reaching a T1 trunk module for outbound transmission.

The voice channels are input from a speech port 654 in a 64 kilobit per second pulse code modulation format.

The module 660 comprises an ADPCM module. This processor consists of a digital speech processor that accepts 64 kilobits per second of PCM input from the DS-1 module in the speech port 654. The digital speech processor in the module is a server of the DS-1 card. Therefore, any input from any DS-1 card in the IDNX can be routed through the digital speech processor. Further, each of the digital speech processor's output channels can be routed through different DS-1 ports as desired. The input to the speech processing module is the 64 kilobit per second pulse code modulation and the output is the multiple of 8 kilobits per second in an ADPCM format. The ADPCM channels are then coded by the CPU module for output on the T1 trunk module 656 at 32 kilobits per second. This provides a 2:1 compression of voice and voice band data signals.

The ADPCM module 660 also handles signal expansion for an ADPCM signal being received from a remote IDNX.

The VOX module 661 is a speech processor module which performs voice detection, dead-set processing and echo suppression of signals from the ADPCM module as a pre-processing step in digital speech interpolation (DSI). From the VOX module, signals are passed to the DSI processor module/port 662 which executes the digital speech interpolation algorithms. In a typical telephone conversation, each speaker is active only about 38 percent of the time. DSI takes advantage of this by sharing trunk bandwidth among several speakers. Only active speakers are given bandwidth. The DSI processor in module 662 is tightly coupled to a T1 trunk to support the dynamic DSI compression algorithm. The bandwidth on the T1 trunk coupled to the DSI processor in module 662 can be dynamically allocated to DSI and non-DSI calls as network requirements change.

The VOX and DSI processor modules 661, 662 can, in conjunction with the ADPCM voice processing card, provide 4:1 compression of the PCM voice channels from channel bank or digital PBX.

The ADPCM module provides 2:1 compression of PCM voice channels. The use of the VOX and DSI modules upon the ADPCM output provides an additional 2:1 compression, for a total of 4:1 compression. One DSI module supports up to 90 PCM voice channels.

In pass-through nodes in the network, the ADPCM module 660, VOX module 661 and DSI module 662 are not required.

III. Data Flow for an Example Channel Call

The data flow for an example call placed at point A through telephone 105 in the network of FIG. 5, to be received at point B through telephone 1008 is illustrated. The call will be placed through the PBX 104 and supplied in full 64 kilobit per second PCM mode to port 101 of IDNX1. In IDNX1, DS-1 module in speech port 655 will transfer the data to the ADPCM speech processor module 660. From the ADPCM module 660, the data will be transferred to the T1 trunk port 656 and out across trunk 70 to IDNX 3.

IDNX3 will receive the data in a trunk port 656 and transfer it to the VOX and DSI speech processor modules 661, 662. In the VOX and DSI speech processor modules 661, 662, it is compressed in the DSI format for transmission on trunk 76 to IDNX5. IDNX5 will receive the data in port 507 at a T1 trunk port module 656 and pass the data through to port 508 to the T1 trunk 80. Data will be received in IDNX7 at port 705 in the T1 trunk port module 656 and transferred to the VOX and DSI speech processor modules 661, 662. From the VOX and DSI speech processor modules 661, 662, the data will be expanded to the ADPCM mode and connected to port 707 for transmission across trunk 83. In IDNX8, data will be passed from the trunk port connected to trunk 83 through port 804 to trunk 87. IDNX10 will receive the full ADPCM coded data at port 1007 in a T1 trunk port module 656. The data will then be passed to the ADPCM speech processor module 660 for expansion to the full PCM mode. Data in the PCM mode will be supplied on port 1001 to the PBX 1004 for connection to the receiving station 1008 at point B.

Obviously, the data flow just described is only one path by which a call placed at point A could arrive at point B through the network shown in FIG. 5. At call placement time, the configuration data base stored in the memory module 656 of IDNX1 is consulted to establish a preferred call route through the network. User-specified parameters of preferred routing such as whether to use DSI or not, trunk traffic intensity for various trunks in the network, and other parameters are consulted. Thus, if the user specifies a call to avoid a DSI trunk, the network provides the path from IDNX1 across trunk 71 to IDNX3, across trunk 74 to IDNX2 across trunk to IDNX6 across trunk 81 to IDNX8 and across trunk 87 to IDNX10 to complete the call without any DSI coding. Further, each node might be adapted to re-compute a call path depending on current bandwidth utilization for their respective trunks.

A call can be designated for DSI at an originating node without the DSI and VOX cards in that node. In this case, a call will proceed through the network until it encounters a node containing DSI and VOX cards, at which time the call will be compressed. The call will continue through the network in DSI format until it reaches either its destination, or a node without DSI cards. If the call reaches a node without DSI cards, it backs up to the nearest node containing these cards where it is decompressed into ADPCM or PCM format, depending on the destination of the call and the particular cards in the remaining nodes of the path for the call.

Once a call has been decompressed from the DSI format, it cannot be compressed again. It will proceed through the network in either ADPCM or PCM format. If desired, DS-1 ports can be configured using the configuration data base in the memory module 658 so that the originating calls are biased toward or against DSI paths.

IV. Node Control Algorithms

Figure 7:
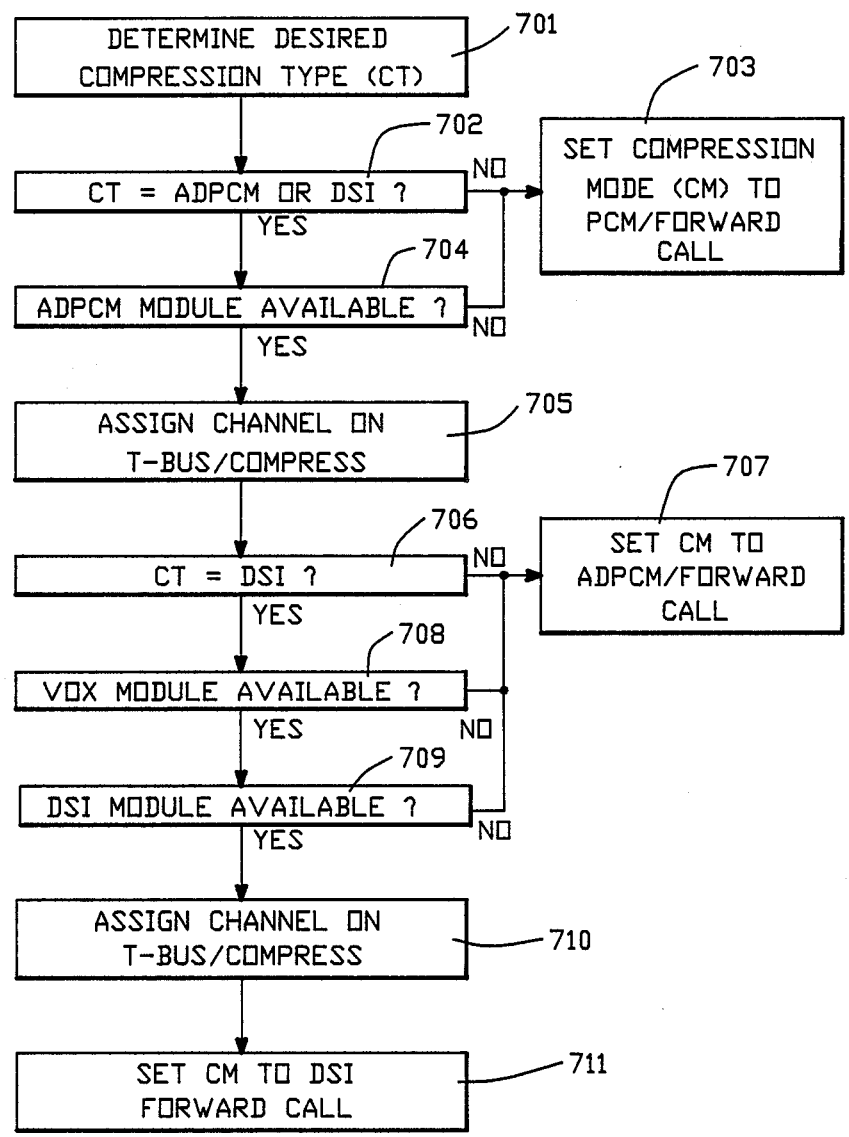
FIG. 7 is a flowchart of a control algorithm for an integrated digital network exchange originating a call.
Figure 8:
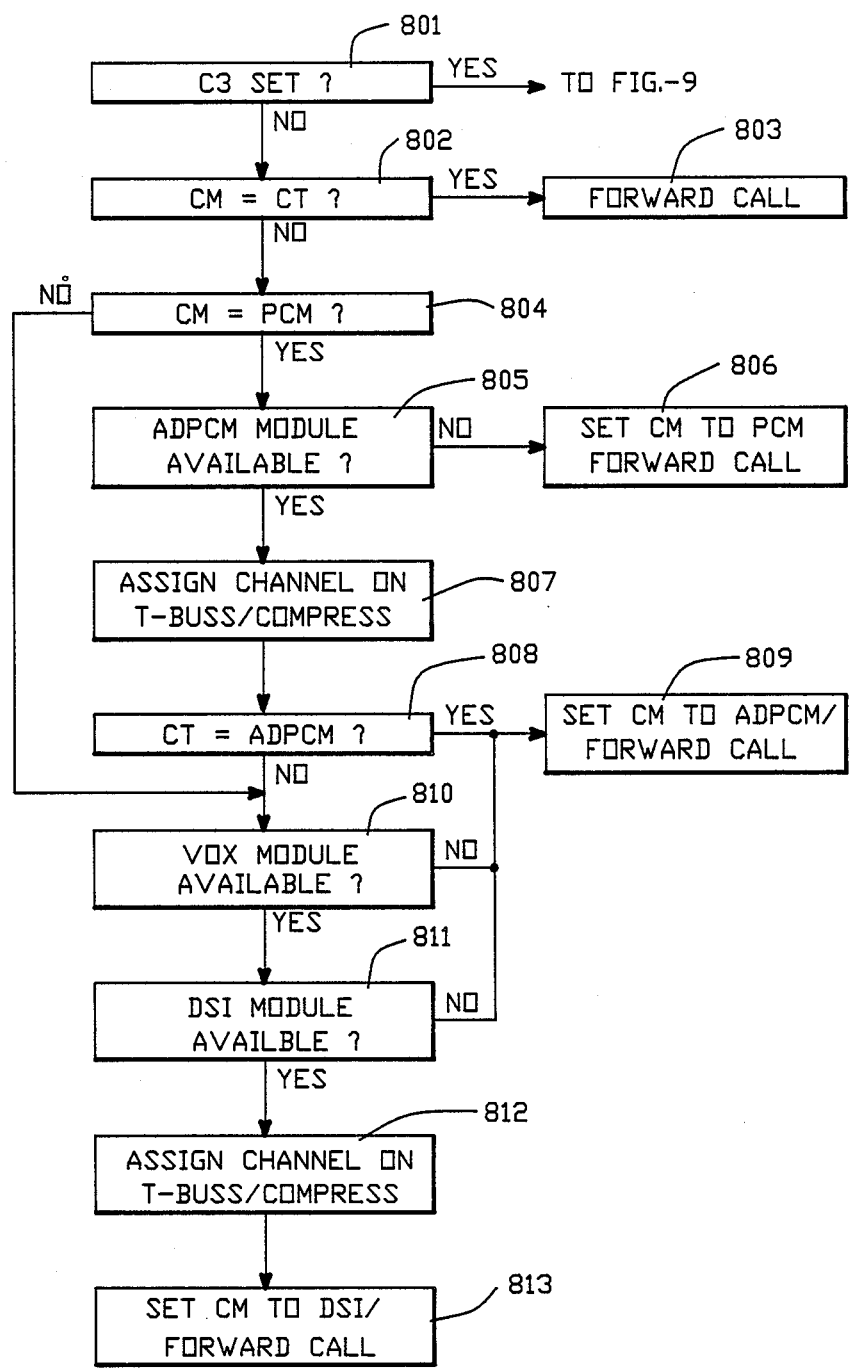
FIGS. 8 and 9 are a flowchart of a control algorithm for an integrated digital network exchange forwarding a call originated at a different node in the network.
Figure 9:
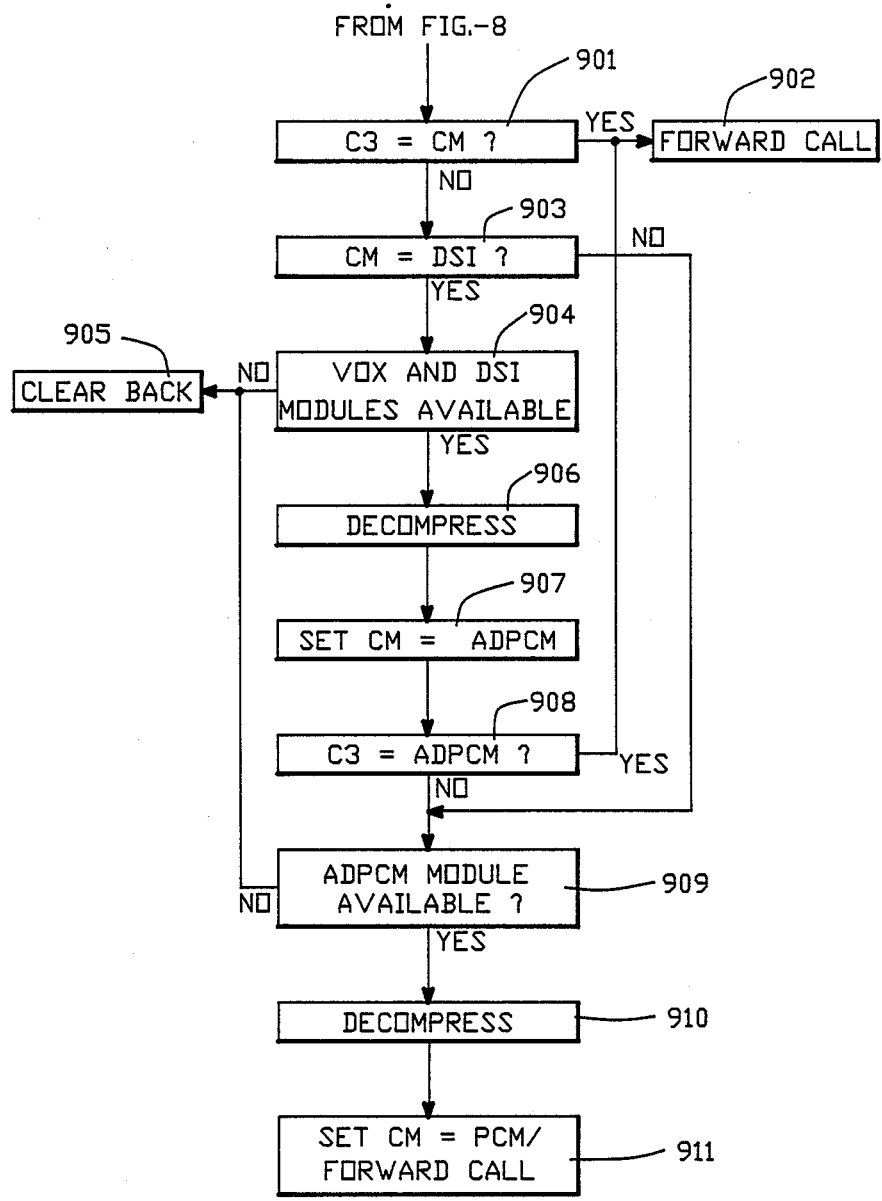
Figure 10:
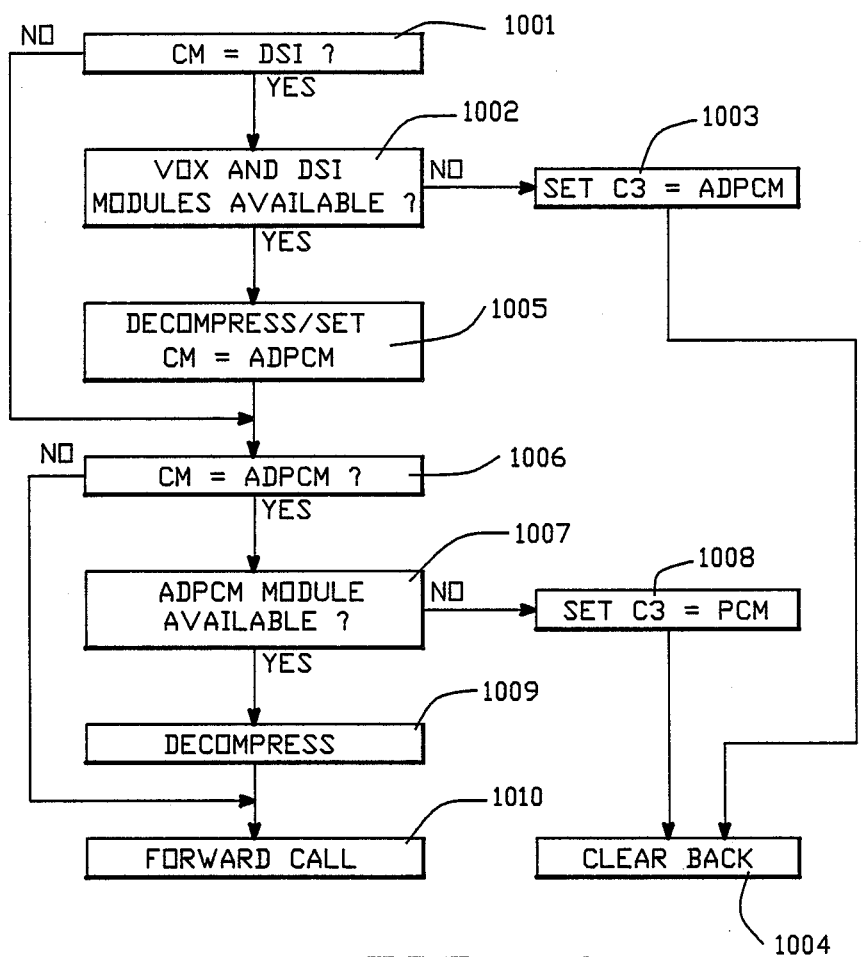
FIG. 10 is a flowchart of a control algorithm for an integrated digital network exchange at the destination of a call.

FIGS. 7–10 illustrate the control algorithms run by the CPUs in integrated digital network exchanges of a multimode compression network according to the present invention. FIG. 7 is the control algorithm for a call origination node. FIGS. 8 and 9 are the control algorithm for intermediate nodes in the network. FIG. 10 is the control algorithm for a call destination node.

A. Call Origination

FIG. 7 is a flowchart illustrating the control algorithm for call origination in an integrated digital network exchange as shown in FIG. 6. When a call is originated, the processor 657 reviews a configuration database in the memory and computes a path through the network for an incoming call. The path is computed in response to parameters stored in the configuration database and parameters associated with the speech ports 655 through which the call is received. One parameter specified with each speech port is a desired compression type CT which can be, in the preferred embodiment, PCM, ADPCM or DSI. A control algorithm pertinent to the compression mode of the present invention begins as illustrated in FIG. 7 by determining the desired compression type CT (block 701). Next, the control process determines whether CT is equal to ADPCM or DSI (block 702). If CT is not equal to ADPCM or DSI, it must be PCM and the control algorithm branches to block 703. In block 703, a call packet is generated which includes the desired compression type CT parameter, an actual compression mode parameter CM, and the destination of the call. In block 703, the compression mode parameter is set to PCM and the call is forwarded to the next node in the computed path.

If in block 702, it is determined that CT is equal to ADPCM or DSI, the control algorithm determines whether an ADPCM module 660 is available (block 704). If no ADPCM module is available, the algorithm branches to block 703 and forwards the call with CM set to PCM. If an ADPCM module is available, the processor 657 assigns a channel on the T-bus 650 and carries out an ADPCM compression (block 705). Next, the algorithm tests whether CT is equal to DSI (block 706). If CT is not equal to DSI, it must be equal to ADPCM, so CM is set to ADPCM and call is forwarded to the next node in the computed path (block 707).

If CT is equal to DSI at block 706, the control algorithm determines whether a VOX module 661 is available (block 708). If no VOX module is available, the algorithm branches to block 707 and forwards the call to CM equal to ADPCM. If a VOX module is available, the control algorithm determines whether a DSI module 662 is available (block 709). If no DSI module is available, the algorithm branches to block 707 and forwards the call with CM equal to ADPCM. If a DSI module is available at block 709, the CPU 657 assigns a channel on the transport bus 650 and compresses the call (block 710). A call is then forwarded to the next node in the computed path with CM equal to DSI (block 711).

It can be seen that the compression mode CM of a given call is determined according to this control algorithm by the available compression resources on the integrated digital network exchange, which originates the call and the desired compression mode CT. The desired compression mode CT is a parameter associated with the speech ports 655 and not with compression resources on the switch. Therefore, a call can be placed in a node having no compression resources that will ultimately be forwarded to a backbone link in the network and compressed using a DSI algorithm.

Further a compression mode of a call is affected by available resources on the originating node. Thus, if a node includes a DSI module 662 that is full, and the desired compression type is DSI, the call is not blocked. Rather, the call will be forwarded with a compression mode of ADPCM or if resources are not available to perform ADPCM compression, as a PCM call to the next node in the path.

Finally, this compression algorithm is suitable for all origination nodes in the network whether or not the physical resources to perform compression are installed on those nodes. Accordingly, the software implementing this control algorithm is highly portable and need not be customized for a variety of types of origination nodes.

B. Intermediate Node Control Algorithm

FIGS. 8 and 9 are a flowchart illustrating the control algorithm for intermediate nodes in the network. Intermediate nodes can perform one of three categories of functions: (1) simply forward the call to a next node in the path; (2) compress the call from its actual compression mode CM to its desired compression mode CT; and, (3) decompress a call in response to a clearback from a neighbor node to which the call is forwarded and which does not have decompression resources available needed to process the call. The parameters used to determine the proper function are the CM and CT parameters as well as a third parameter designated C3.

The C3 parameter is a clearback mode indicating a compression mode at which a neighbor node desires to receive the call so that it can complete processing. C3 is set in a call packet only when the clearback of the call has occurred.

The control algorithm of an intermediate node begins in FIG. 8 by determining whether C3 is set (block 801). If C3 is set, the algorithm branches to the control flow illustrated in FIG. 9. If C3 is not set, the control flow determines whether CM is equal to CT (block 802). If CM equals CT, the intermediate node merely forwards the call to the next node in the computed path (block 803).

If CM is not equal to CT at block 802, the algorithm determines whether CM is equal to PCM (block 804). If CM is equal to PCM, then it is determined whether an ADPCM module is available (block 805). If the ADPCM resources are not available, CM is then set to PCM and the call is forwarded to the next node (block 806). If the resources are available, the processor assigns a channel on the transport bus and compresses the call (block 807). Next, it determines whether CT is equal to ADPCM (block 808). If it is, then CM is set to ADPCM and the call is forwarded to the next node (block 809). If CT is not equal to ADPCM at block 808, or if CM is not equal to PCM at block 804, the algorithm determines whether a VOX module is available (block 810). If a VOX module is not available, CM is set to ADPCM and the call is forwarded at block 809. If the VOX module is available, then it is determined whether a DSI module is available (block 811). If no DSI module is available, the call is forwarded with CM equal to ADPCM at block 809. If the DSI module is available at block 811, the CPU assigns a channel on the transport bus and compresses the call (block 812). Then CM is set to DSI and the call is forwarded to the next node on the path (block 813).

If C3 is set at block 801, the control flow illustrated in FIG. 9 is followed. First, it is determined whether C3 is equal to CM (block 901). If it is, then the call is forwarded to the next node in the path (block 902). If C3 is not equal to CM at block 901, then it is determined whether CM is equal to DSI (block 903). If CM is equal to DSI, the algorithm determines whether the VOX and DSI modules are available to decompress the call (block 904). If the VOX and DSI modules are not available, then the call is cleared back with C3 and CM unchanged (block 905). If the decompression resources are available at block 904, the call is decompressed (block 906). Then, CM is set to ADPCM (block 907). Next, C3 is tested to determined whether it is equal to ADPCM (block 908). If C3 is equal to ADPCM, the call is forwarded at block 902 to the next node in the path.

If C3 is not equal to ADPCM at block 908, or if CM is not equal to DSI at block 903, then C3 must be PCM and CM must be ADPCM and the control algorithm determines whether an ADPCM module is available (block 909). If an ADPCM module is not available, then the call is cleared back with CM equal to ADPCM from block 905).

If an ADPCM module is available at block 909, the call is decompressed (block 910), CM is set to PCM and call is forwarded (block 911).

This control flow is adapted to be used on any intermediate node on the network, and is therefore highly portable among integrated digital network exchanges. Further, it allows for compression or decompression of calls originated at or destined to other nodes in the network. In this manner, each intermediate node can process calls communicated on backbone links, outer layer links or access layer links and can operate as an interface between links in different compression modes.

C. Destination Control Flow

FIG. 10 is a flowchart illustrating a control algorithm for a call destination node. The first step of the destination control flow is to determine whether CM is equal to DSI (block 1001). If CM is equal to DSI, it is determined whether the VOX and DSI modules are available to decompress the call (block 1002). If they are not available, the algorithm sets the clearback parameter C3 equal to ADPCM (block 1003) and the call is cleared back (block 1004). If the VOX and DSI modules are available at block 1002, the call is decompressed and CM is set to ADPCM (block 1005).

If CM is not equal to DSI at block 1001 or after block 1005, the algorithm determines whether CM is equal to ADPCM at block 1006. If CM equals ADPCM, it is determined whether an ADPCM module is available to decompress the call to the PCM format (block 1007). If the resources are not available, then C3 is set to PCM (block 1008) and the call is cleared back at block 1004. If the ADPCM resources are available to decompress the call at block 1007, the call is decompressed (block 1009). Finally, if CM is not equal to ADPCM at block 1006, or after decompression at block 1009, the call is in the PCM format and it is forwarded to the receiver (block 1010).

Again, this control flow is suitable for use in destination nodes in the network independent of the mode of compression at which the call is received and of the compression resources available on that node. Therefore, the control algorithm software is highly portable. Obviously, the control flows illustrated in FIGS. 7–10 can be adapted individually to nodes in networks in which the compression mode is less dynamically allocated.

CONCLUSION

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for communicating information among a network of stations for sending and receiving the information, comprising:

a plurality of switching nodes;

a plurality of links connecting the switching nodes in a communication network, the links including means for transmitting channels of coded information between neighboring nodes;

at least a first node of the switching nodes comprising, station port means, coupled to a station in the network, for communicating information to and from the station, first link port means, coupled to a link in the plurality of links, for communicating information to and from the link, first connecting means, coupled to the station port means and the first link port means, for connecting information to the station port means or the first link port means for transmission on a selected link in the plurality of links or to a selected station in the network, and first coding means, including means for performing a plurality of compression algorithms, coupled to the station port means and the connecting means, for coding the information from a station in the network according to a selected one of the plurality of compression algorithms for transmission in one of a plurality of compression modes corresponding to the selected one of the plurality of compression algorithms, the first coding means including means for selecting the selected one of the plurality of compression algorithms in response to a desired compression mode for transmission of the information, decoding means, including means for performing a plurality of decompression algorithms, coupled to the first link port means and the first connecting means, for decoding information from a compression mode according to a selected one of the plurality of decompression algorithms for communicating to a station in the network, the decoding means further including means for selecting the selected one decompression algorithm in response to the compression mode in which the information is received; and at least a second node of the switching nodes comprising, a plurality of second link port means, each coupled to a link in the plurality of links, for communicating information to and from the links, second connecting means, coupled to the plurality of link port means, for connecting information to one of the plurality of link port means for transmission on a selected link coupled to the one of the plurality of link port means, and second coding means, including means for performing a plurality of compression algorithms coupled to the plurality of second link port means and the connecting means, for coding the information according to a selected one of the plurality of compression algorithms for transmission according to a corresponding compression mode, the second coding means further including means for selecting the selected one compression algorithm in response to the compression mode in which the information is received and the desired compression mode for transmission of the information.

2. The apparatus of claim 1, wherein the information is voice data.

3. The apparatus of claim 2, wherein at least one of the stations in the network is a private branch exchange (PBX).

4. The apparatus of claim 1, wherein the plurality of compression modes includes a first mode in which the information is coded at a first bit rate, and a second mode in which the information is coded at a second bit rate.

5. The apparatus of claim 2, wherein the information is coded by Pulse Code Modulation, and the plurality of compression modes includes a first mode in which the information is coded by Adaptive Differential Pulse Code Modulation, and a second mode in which information is coded by Digital Signal Interpolation.

6. The apparatus of claim 1, wherein the channels include destination data identifying the destination of information in the channels and the connecting means include:

means for storing configuration data identifying a configuration of the network; and means, responsive to the destination data in a given channel and the configuration data, for selecting the selected link or selected station.

7. The apparatus of claim 1, wherein the first node includes means for generating control information concerning information in a channel, and the control information includes a first code indicating the desired compression mode for transmission of the information and a second code indicating the mode in which the information is being transmitted.

8. An apparatus for communicating information among a network of stations for sending and receiving the information, comprising:

a plurality of switching nodes;

a plurality of links connecting the plurality of switching nodes in a communication network, the links including means for transmitting channels of coded information between neighboring nodes;

at least a first node in the plurality of switching nodes comprising, station port means, coupled to a first station, for communicating information in a first compression mode to and from the station, first link port means, coupled to a first link in the plurality of links, for communicating information to and from the first link, first connecting means, coupled to the station port means and the first link port means, for connecting information to the station port means or the first link port means for transmission on the first link or to the first station;

at least a second node of the switching nodes comprising, a plurality of second link port means, each coupled to a given link in the plurality of links, for communicating information to and from the given link, second connecting means, coupled to the plurality of second link port means, for connecting information to one of the plurality of second link port means for transmission on a selected given link in the plurality of links, and second coding means, coupled to the plurality of second link port means and the second connecting means, for coding the information in the first compression mode according to a first compression algorithm for transmission in a second compression mode, second decoding means, coupled to the plurality of link port means and the connecting means, for decoding information from the second compression mode to the first compression mode according to a first decompression algorithm; and at least a third node of the switching nodes comprising, a plurality of third link port means, each coupled to a given link in the plurality of links, for communicating information to and from the given links, third connecting means, coupled to the plurality of third link port means, for connecting information to one of the plurality of third link port means for transmission on a selected given link, third coding means, coupled to the plurality of third link port means and the third connecting means, for coding the information in the second compression mode according to a second compression algorithm for transmission in a third compression mode, third decoding means, coupled to the plurality of third link port means and the third connecting means, for decoding information from the third compression mode to the second compression mode according to a second decompression algorithm.

9. The apparatus of claim 8, wherein the information is voice data.

10. The apparatus of claim 9, wherein at least one of the stations in the network is a private branch exchange (PBX).

11. The apparatus of claim 9, wherein the information in the first compression mode is coded according to a Pulse Code Modulation algorithm, and the first compression algorithm is Adaptive Differential Pulse Code Modulation, and a second compression algorithm is Digital Signal Interpolation.

12. The apparatus of claim 8, wherein the channels include destination data identifying the destination of information in the channels and the second connecting means includes:

means for storing configuration data identifying the configuration of the network; and means, responsive to the destination data in a given channel and the configuration data, for selecting the selected given link.

13. A method for transmitting information through a communication network, the network including a plurality of nodes interconnected by communication links, the method comprising the steps of:
receiving information at a first node in a first mode, coding the received information according to a first compression algorithm to a second mode and transmitting the information in the second mode through one of the communication links connected to the first node to a second node,
receiving at the second node the information in the second mode, coding the information according to a second compression algorithm to a third mode and transmitting the information in the third mode through one of the communication links connected to the second node to a third node.

14. The method of claim 13, wherein the information coded in the second mode is transmitted to the second node through one or more intermediate nodes.

15. The method of claim 13, wherein the information coded in the third mode is transmitted to the third node through one or more intermediate nodes.

16. The method of claim 13, further including the steps of:
receiving at the third node the information in the third mode, coding the information according to a first expansion algorithm to generate information in the second mode and transmitting the information in the second mode through one of the communication links connected to the third node to a fourth node; and
receiving at the fourth node the information in the second mode, coding the information according to a second expansion algorithm to generate information in the first mode.

17. The method of claim 16, wherein the information coded in the second mode is transmitted to the fourth node through one or more intermediate nodes.

18. A method for processing information at a node in a communication network, the network including a plurality of nodes interconnected by communication links, and the information in the network being coded at a plurality of levels of compression and the information on a given communication link in the network having an actual level of compression, the method comprising the steps of:
receiving information at the node from a communications link;
determining the actual level of compression;
determining a desired level of compression for transmission of the information;, and
if the actual level equals the desired level, then transmitting the information to another node, or
if the actual level is not equal to the desired level, then coding the information to the desired level and transmitting the information to another node.

19. The method of claim 18, wherein the information is voice data.

20. The method of claim 19, wherein there is an intermediate level of compression between the actual level and the desired level, and the step of determining whether resources are available includes
determining whether resources are available for coding the data to the intermediate level, and if resources are not available, then transmitting the information to another node, or if the resources are available, then coding the information to the intermediate level, and
determining whether resources are available for coding the information to the desired level from the intermediate level, and if resources are available, then coding the information to the desired level and transmitting the information at the desired level to another node, or if the resources are not available, then transmitting the information at the intermediate level to another node.

21. The method of claim 18, wherein the information includes a control packet, and the control packet includes a first code indicating the desired level of compression for transmission of the information, and a second code indicating the actual level of compression.

22. A method for processing information at a node in a communication network, the network including a plurality of nodes interconnected by communication links, and the information in the network being coded at a plurality of levels of compression, the information on a given communication link in the network having an actual level of compression, the method comprising the steps of:
receiving information at the node from a communication link;
determining the actual level of compression;
determining a desired level of compression for transmission of the information; and
if the actual level equals the desired level, then transmitting the information to another node, or
if the actual level is not equal to the desired level, then determining whether the node has resources available for coding the information from the actual level to the desired level, and if resources are available, coding the information to the desired level and transmitting the information at the desired level to another node, or if resources are not available, then transmitting the information at the actual level to another node.

23. The method of claim 22, wherein the information is voice data.

24. The method of claim 22, wherein the information is coded in a first level by Pulse Code Modulation, the information is coded in a second level by Adaptive Differential Pulse Code Modulation, and the information is coded in a third level by Digital Signal Interpolation.

25. The method of claim 22, wherein the information includes a control packet, and the control packet includes a first code indicating the desired level of compression for transmission of the information, and a second code indicating the actual level of compression.

* * * * *